United States Patent
Manalo et al.

(10) Patent No.: US 10,244,380 B2
(45) Date of Patent: *Mar. 26, 2019

(54) REGISTRATION OF A ROAMING UE ONTO A PREFERRED VPLMN USING AIRPLANE MODE OF OPERATION

(71) Applicant: TELUS Communications Company, Edmonton (CA)

(72) Inventors: Robert E. Manalo, North York (CA); Prashanth Dappula, Scarborough (CA)

(73) Assignee: TELUS COMMUNICATIONS INC., Edmonton (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/426,974

(22) Filed: Feb. 7, 2017

(65) Prior Publication Data

US 2017/0150341 A1    May 25, 2017

Related U.S. Application Data

(63) Continuation of application No. 14/281,816, filed on May 19, 2014, now Pat. No. 9,565,547.

(30) Foreign Application Priority Data

May 17, 2013   (CA) ...................................... 2816684

(51) Int. Cl.
*H04W 8/06* (2009.01)
*H04W 8/18* (2009.01)
(Continued)

(52) U.S. Cl.
CPC ............... *H04W 8/06* (2013.01); *H04W 8/18* (2013.01); *H04W 8/183* (2013.01); *H04W 8/26* (2013.01);
(Continued)

(58) Field of Classification Search
CPC ............ H04W 8/06; H04W 8/12; H04W 8/18
See application file for complete search history.

(56) References Cited

U.S. PATENT DOCUMENTS

| 7,072,651 B2 | 7/2006 | Jiang |
| 7,089,001 B2 | 8/2006 | Leung |

(Continued)

FOREIGN PATENT DOCUMENTS

| CA | 2 478 576 A1 | 9/2003 |
| CA | 2 504 497 A1 | 5/2004 |

(Continued)

OTHER PUBLICATIONS

US 7,526,319, 04/2009, Aubert (withdrawn)

*Primary Examiner* — Kamran Afshar
*Assistant Examiner* — Farideh Madani
(74) *Attorney, Agent, or Firm* — Christensen O'Connor Johnson Kindness, PLLC

(57) ABSTRACT

Disclosed is a method in which a User Equipment will be able to register near instantly onto an available preferred roaming network, when the cellular radio of the UE is powered on. The method disclosed comprises of a roaming destination determined from a mobile boarding pass or input via User Interface of an Application installed on the Mobile Equipment or via UI on the Operating System of the ME, where the Application or OS compares the roaming destination with a PLMN list to obtain the preferred PLMN ID of that roaming destination which is selected and updated to specific files within the UICC. LTE and/or UMTS band information can also be obtained for the roaming destination and an MRU database updated to include the LTE and/or UMTS band information. A specific REFRESH command that is sent from the UICC to the ME prior to turning off the cellular radio of the UE, is used in the disclosed method to achieve near instant or instant registration onto the preferred (Continued)

visited PLMN when the cellular radio of the UE is turned on upon arrival at roaming destination. Alternatively, the ME can send a reset signal to the UICC when turning on the cellular radio of the UE upon arrival at the roaming destination.

6 Claims, 12 Drawing Sheets

(51) Int. Cl.
    *H04W 48/18* (2009.01)
    *H04W 8/26* (2009.01)
    *H04W 60/00* (2009.01)
    *H04W 72/10* (2009.01)

(52) U.S. Cl.
    CPC ........... *H04W 48/18* (2013.01); *H04W 60/00* (2013.01); *H04W 72/10* (2013.01)

(56) References Cited

U.S. PATENT DOCUMENTS

| | | |
|---|---|---|
| 7,127,245 B2 | 10/2006 | Almgren |
| 7,139,570 B2 | 11/2006 | Elkarat |
| 7,366,510 B2 | 4/2008 | Gunaratnam |
| 7,383,054 B2 | 6/2008 | Chou |
| 7,389,109 B2 | 6/2008 | Hind |
| 7,447,499 B2 | 11/2008 | Bridges |
| 7,818,024 B2 | 10/2010 | Gunaratnam |
| 7,929,953 B2 | 4/2011 | Jiang |
| 8,229,431 B2 | 7/2012 | Buckley |
| 9,026,107 B2 | 3/2015 | Manalo |
| 2005/0037737 A1 | 2/2005 | Aubert |
| 2005/0186951 A1* | 8/2005 | Bumiller ......... H04M 1/274566 455/418 |
| 2006/0052100 A1* | 3/2006 | Almgren ................. H04W 8/12 455/432.1 |
| 2006/0217153 A1 | 9/2006 | Coles |
| 2007/0213050 A1 | 9/2007 | Jiang |
| 2009/0215447 A1 | 8/2009 | Catalano |
| 2009/0215449 A1 | 8/2009 | Avner |
| 2009/0318148 A1* | 12/2009 | Zinn ..................... H04W 8/183 455/435.2 |
| 2010/0099403 A1* | 4/2010 | Kim ..................... H04W 8/183 455/432.1 |
| 2010/0136967 A1 | 6/2010 | Du |
| 2010/0190497 A1 | 7/2010 | Pudney |
| 2011/0075608 A1 | 3/2011 | Chai |
| 2011/0089229 A1 | 4/2011 | Shenfield |
| 2012/0309374 A1 | 12/2012 | Tagg |
| 2012/0322474 A1 | 12/2012 | Moisanen |
| 2013/0231105 A1 | 9/2013 | Bai |

FOREIGN PATENT DOCUMENTS

| | | |
|---|---|---|
| CA | 2 517 581 A1 | 5/2005 |
| CA | 2 545 824 A1 | 5/2005 |
| CA | 2 498 430 A1 | 8/2005 |
| CA | 2 727 750 A1 | 3/2006 |
| CA | 2 577 689 A1 | 8/2007 |
| EP | 1 672 943 A1 | 6/2006 |
| EP | 1 527 653 B1 | 10/2007 |
| EP | 2 437 551 A1 | 4/2012 |
| WO | 2008/027660 A2 | 3/2008 |

* cited by examiner

REGISTRATION OF A ROAMING UE ONTO A PREFERRED VPLMN USING AIRPLANE MODE OF OPERATION

CROSS-REFERENCE TO RELATED APPLICATION

This application is a continuation of application Ser. No. 14/281,816, filed May 19, 2014, the entire disclosure of which is hereby incorporated by reference herein.

FIELD

Network Selection Procedure of a Mobile Equipment through interaction via comparisons, updates and signals to the UICC, and commands from the UICC.

BACKGROUND

The majority of wireless networks around the world today are 3GPP standard based supporting GSM and/or UMTS and/or LTE Radio Access Technologies. A 3GPP based User Equipment, which consists of a Mobile Equipment containing a UICC provisioned by the home Public Land Mobile Network operator, is able to distinguish one PLMN operator from another based on the unique PLMN ID, consisting solely of the MCCMNC, broadcasted by each PLMN operator and will be able to register onto its home PLMN if available. If the User Equipment is no longer able to detect the home PLMN ID, and is able to detect the PLMN ID of another PLMN operator, the UE will be able to register successfully onto a visited PLMN provided a roaming agreement exists between the home PLMN operator and the VPLMN operator.

Many people typically travel by airplane from their home country to a foreign country, and bring their UE in order to contact family, friends or colleagues back home or in the foreign country they are travelling to, upon arrival. Since almost all Airline operators require UEs to be turned off prior to takeoff, many ME manufacturers build into their ME a feature called Airplane Mode, which allows the cellular radio of the ME to be turned off when Airplane Mode is enabled/turned on, in order to comply with Airline rules and regulations. While Airplane Mode is enabled/turned on, the rest of the ME is still able to function as normal in order to allow the person travelling to enjoy listening to music, watching videos, reading eBooks or using any other functionality of their ME which does not require use of the cellular radio, during their travel while in the airplane. Once the airplane has landed safely, Airplane Mode is allowed to be disabled/turned off which turns the cellular radio back on, thus allowing the UE to attempt registration on the available VPLMN(s).

In addition to Airplane Mode, all ME manufacturers are required by 3GPP standard to implement both Automatic and Manual Network Selection modes on their MEs. MEs are typically set to Automatic Network Selection mode by default and the majority of users typically leave the ME set to this mode. Therefore, when a roaming UE's cellular radio is turned on in a foreign country with multiple VPLMNs available, for which registration is possible (due to bilateral network agreements), a UE in Automatic Network Selection mode follows the related Network Selection Procedures outlined in 3GPP TS 23.122 clause 4.4.3.1 and 4.4.3.3.

However, as per 3GPP standard, the UE is required to attempt registration on the last registered PLMN as indicated in the EF_LOCI and EF_EPSLOCI files in the UICC. Should the last registered PLMN not be available, which is typically the case when travelling to a foreign country, the UE in Automatic Network Selection mode must follow the related Network Selection Procedures outlined specified above.

SUMMARY

Depending on how many VPLMNs are available, how many Access Technologies are supported on the ME and on each VPLMNs as well as how many frequencies are supported on the ME and on each VPLMNs, the time it takes for the UE to register onto a VPLMN can be significantly long, where some UEs can take over 3 minutes, thus potentially creating a poor user experience.

United States Pre-Grant Publication No. 20100099403 (the '403 application) attempts to resolve the problem of long registration through two of its claims related to storing the PLMN ID in the LOCI of the SIM. However, the inventor considers that the processes disclosed in the '403 application will still result in a relatively long register time for the ME.

Canadian Patent No. 2,724,871, also makes reference to updating EF_LOCI in the USIM ADF of the UICC to provide instant registration. However, the time it takes to for first time registration onto the non-preferred VPLMN in Canadian Patent No. 2,724,871, can still be significantly long.

What is disclosed overcomes the limitations described above, by using an unprecedented combination of techniques and procedures outlined in the disclosed claims to achieve instant first time registration within 30 seconds onto an available visited preferred PLMN when Airplane Mode is turned off.

In an embodiment, there is disclosed a method of Registration of a roaming UE in Automatic Network Selection mode onto a preferred VPLMN comprising overwriting an entry in one or more elementary files containing location information in the UICC with identification for the preferred VPLMN network. The method may further comprise receiving a Mobile Country Code (MCC), comparing the received MCC with MCCs of PLMN IDs stored in a PLMN list, and selecting the preferred VPLMN by selecting a highest priority PLMN ID in the PLMN list whose MCC is the first instance that matches the MCC received via the User Interface of the ME.

In various embodiments, there may be provided one or more of: the MCC is received via a user interface on the ME; the MCC is received by obtaining a destination country or city from a mobile boarding pass and determining an MCC corresponding to the destination country or city; obtaining LTE and/or UMTS band information associated with the received MCC and updating an MRU database in the ME with the LTE and/or UMTS band information; the one or more elementary files comprise EF_LOCI; the one or more elementary files comprise EF_EPSLOCI; EF_LOCI and EF_EPSLOCI are updated by overwriting PLMN ID content of EF_LOCI and EF_EPSLOCI with the selected highest priority PLMN ID, while keeping existing bytes intact and last byte set to "updated"; the PLMN ID content of EF_LOCI is bytes 5, 6 and 7 of File ID 6F7E and the PLMN ID content of EF_EPSLOCI is bytes 3, 4, 5, 13, 14 and 15 of File ID 6FE3, and setting the last byte to "updated" is setting the last byte to 00; the PLMN list is the EF_OPLMNwAcT file or a file stored in the memory of the ME or Application installed on the ME; REFRESH—File Change Notification including the one or more elementary files in the REFRESH File List, is sent from a UICC to the ME, once updating the one or more elementary files is completed; a reset signal comprising of either Activation and Warm Reset or Activation and Cold Reset as per ISO/IEC 7816-3, is sent from the ME to the UICC whenever the cellular radio of the ME is turned on by toggling Airplane Mode OFF; Registration onto a preferred VPLMN is accomplished by turning the cellular radio of the ME off by toggling Airplane Mode ON in the current registered PLMN, then turning the cellular radio of the ME on by toggling Airplane Mode OFF in the roaming destination where the preferred VPLMN is available; Registration onto the available preferred VPLMN occurs within 30 seconds, measured from the time when Airplane Mode is turned OFF; the method steps are carried out by an application installed on the ME or the OS of the ME.

There is further disclosed Mobile Equipment configured to carry out the method steps, and a method of causing Registration of a roaming UE in Automatic Network Selection mode onto a preferred VPLMN comprising sending instructions from either the UICC to the ME or the ME to the UICC to cause the UE to carry out the method steps; and non-transitory memory medium containing software instructions which when carried out on a ME cause the UE to carry out the method steps.

DETAILED DESCRIPTION

There will now be described embodiments of Registration of a roaming UE in Automatic Network Selection mode onto a preferred VPLMN with reference to the drawings by way of example, in which.

DETAILED DESCRIPTION

Registration of a roaming UE in Automatic Network Selection mode onto a preferred VPLMN can be implemented using either an Application installed on the ME or by implementing the disclosed method within the OS of the ME itself.

For implementing the disclosed embodiments by use of an Application, often referred to as an App, this would typically be done by an App Developer. The majority of Apps today are developed primarily for Apple iOS, Google Android, BlackBerry OS and Windows Phone Platforms, though Apps can also be developed for other less known OS Platforms. Once developed, the App is hosted and distributed on a dedicated server for each OS Platform, such as Apple App Store, Google Play Store, BlackBerry World or Windows Phone Store, from which the user can download onto the ME. Once downloaded, the App is then either automatically installed onto the ME or manually installed by the user onto the ME.

For implementing the disclosed embodiments within the OS of the ME itself, this would typically be done by the manufacturer of the ME or the vendor who developed and supplied the OS of the ME to the manufacturer.

A UICC card (a non-transitory storage medium) may also be configured to include software for carrying out the method, and may be provided with the ME when the ME is provided to a customer. A non-transitory medium containing the instructions for a UICC or ME to carry out Registration of a roaming UE in Automatic Network Selection mode onto a preferred VPLMN may include any computer memory, including a computer storage device or devices managed or owned by an app vendor or distributor.

The UE could also download software over a telecommunications network that includes instructions to cause the ME to carry out Registration of a roaming UE in Automatic Network Selection mode onto a preferred VPLMN. The software could be delivered before or after the UE started roaming, and then used while roaming.

Figure 1:
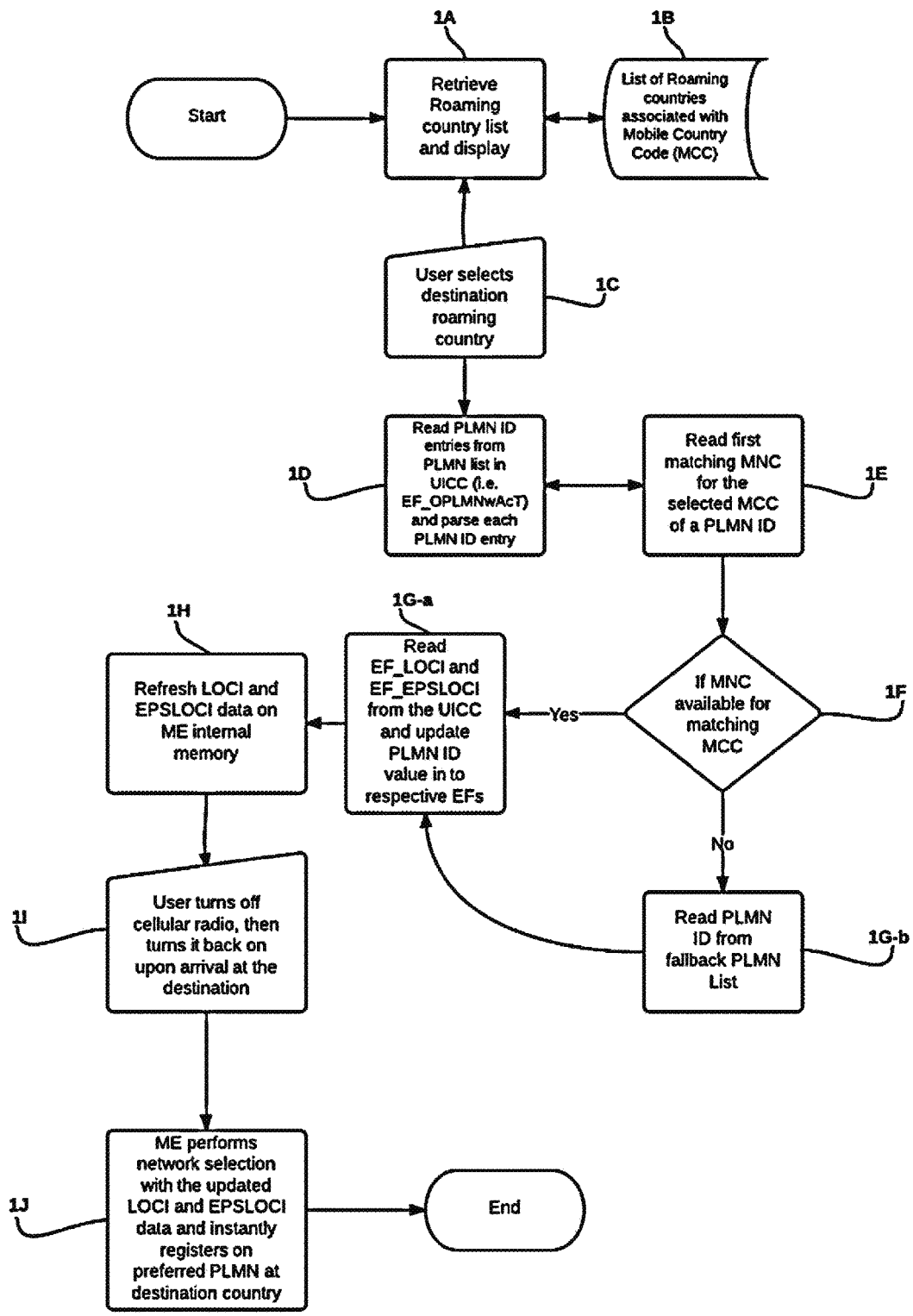
FIG. 1 is a flow diagram illustrating an exemplary embodiment of the present invention where a Mobile Country Code (MCC) is selected using a User Interface and REFRESH—File Change Notification is used.

In FIG. 1, one embodiment of Registration of a roaming UE in Automatic Network Selection mode onto a preferred VPLMN is presented in a Flow Diagram where a MCC is selected using a User Interface and REFRESH—File Change Notification is used, which can be implemented on either an Application or within the OS of the ME itself.

In the Flow Diagram of FIG. 1, Registration of a roaming UE in Automatic Network Selection mode onto a preferred VPLMN is typically started by launching the installed Application on the ME or by navigating within the Menu settings of the OS on the ME itself, both of which would display a list of countries on their respective User Interface, as depicted in Process Box 1A.

The list of countries presented in the UI is retrieved from a database which is either built into the Application or stored in the memory of the ME, which contains the list of countries and their associated MCCs as depicted in Database Box 1B.

The user would then select one of the countries displayed in the UI as depicted in User Input Box 1C, based on which country the user will be visiting.

Once a country is selected, the Application or OS on the ME begins reading the PLMN IDs from the PLMN List in the UICC, which is typically the EF_OPLMNwAcT, and parses each entry, as depicted by Process Box 1D.

The Application or OS on the ME then checks for the first MNC instance from the parsed PLMN ID entries matching the selected MCC, as depicted in the Process Box 1E.

The Application or OS on the ME then performs a decision procedure, as depicted in Decision Box 1F, based on whether a first matching MNC instance for the selected MCC was found in Process Box 1E.

If an MNC for the selected MCC is available, then both EF_LOCI and EF_EPSLOCI values are read from the UICC and bytes 5, 6 and 7 of EF_LOCI and bytes 3, 4, 5, 13, 14 and 15 of EF_EPSLOCI are updated with the PLMN ID, containing the MCC of the selected country and first matching MNC instance for the selected MCC, as depicted in Process Box 1G-a.

It should be noted as part of Registration of a roaming UE in Automatic Network Selection mode onto a preferred VPLMN that all other bytes in the respective EFs shall remain intact, as well the last byte shall remain in updated status (i.e., "00"), which is typically the case if UE was successfully last registered on their HPLMN prior to travelling. Keeping all other byte values intact and more importantly, keeping last byte set to "00" is necessary for instant or near instant registration to occur.

Updating EF_LOCI as disclosed allows for instant or near instant registration on available preferred VPLMNs supporting UMTS and GSM Radio Access Technologies, while updating EF_EPSLOCI using as disclosed allows for instant or near instant registration on available preferred VPLMNs supporting LTE Radio Access Technology. This is of course assuming that a roaming agreement between the HPLMN operator and VPLMN operator is in place, for all supporting Radio Access Technologies and frequencies on both the ME and the VPLMN.

However, if an MNC is not available, then PLMN IDs are read from fallback PLMN List contained within the Application or the memory of the ME, as depicted in Process Box 1G-b.

Once a PLMN ID whose MCC matches the selected MCC is found, then both EF_LOCI and EF_EPSLOCI values are read from the UICC and bytes 5, 6 and 7 of EF_LOCI and bytes 3, 4, 5, 13, 14 and 15 of EF_EPSLOCI are updated with the PLMN ID from the fallback PLMN List.

In order to accomplish the above procedures in the method disclosed, involving reading and updating EFs on the UICC, the UICC must support GPSEAC or any other ACF supported by the OS on the ME. In addition, the OS on the ME must have support to access the UICC or APIs to enable third party Applications to access the UICC (for example, SEEK for Android/OpenMobile API), though it may be possible for an OS developer to implement a proprietary solution to read and write to EFs on the UICC.

Once the update of EF_LOCI and EF_EPSLOCI with the preferred PLMN ID of the selected country is complete, as depicted in Process Box 1H, REFRESH—File Change Notification containing EF_LOCI and EF_EPSLOCI in the REFRESH File List is sent from the UICC to the ME advising the ME that the contents of these respective EFs have been changed and that any image within the ME's internal memory needs to be refreshed, meaning that previously stored LOCI and EPSLOCI data in the internal memory of the ME needs to be replaced with new LOCI and EPSLOCI data containing the preferred PLMN ID of the selected country. This is performed in accordance to ETSI TS 102 223.

The mechanism by which REFRESH—File Change Notification is sent from the UICC to the ME, can be accomplished using a SIM Toolkit App within the UICC. The SIM Toolkit App on the UICC monitors any update to a specific file in the EF performed by the Application on the ME or OS of the ME, or waits for an APDU command sent by the Application on the ME or OS of the ME. Once an update occurs or an APDU command is received, the SIM Toolkit App sends the REFRESH—File Change Notification command with EF_LOCI and EF_EPSLOCI in the REFRESH File List to the ME from the UICC.

In User Input Box 1I, the user then turns off the cellular radio by turning Airplane Mode ON while still in the current destination. Once the user arrives in the selected country, user will then turn Airplane Mode OFF which turns the cellular radio back on.

In Process Box 1J, once the cellular radio is turned on, this triggers the ME to perform an Automatic Mode Network Selection procedure as defined in 3GPP TS 23.122. Since the LOCI and EPSLOCI data in the internal memory of the ME contains the preferred PLMN ID of the available preferred PLMN in the selected country in which the UE is roaming, registration onto this preferred PLMN will occur within 30 seconds, thus reducing the time that it would have taken to register for UEs which do not use what is disclosed here.

Figure 2:
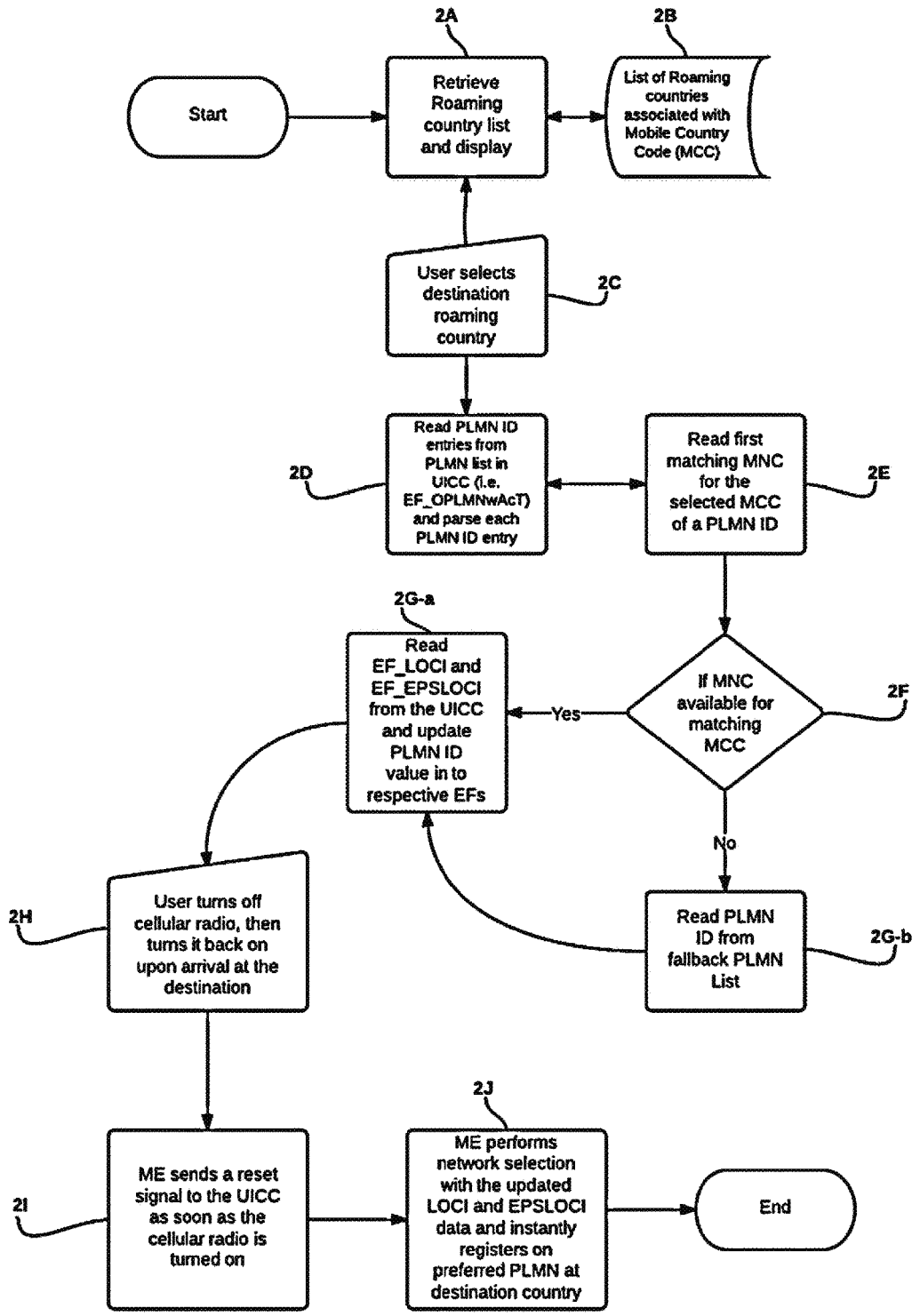
FIG. 2 is a flow diagram illustrating an exemplary embodiment of the present invention where a MCC is selected using a User Interface and a reset signal is used.

In FIG. 2, another embodiment of Registration of a roaming UE in Automatic Network Selection mode onto a preferred VPLMN is presented in a Flow Diagram where a MCC is selected using a User Interface and a reset signal is used, which can be implemented within the OS of the ME itself, and possibly on an Application depending if APIs supporting the sending of a reset signal to the UICC are exposed for a particular OS Platform to the App Developer.

The description described in 1A to 1G-a/b and 1J can also apply to 2A to 2G-a/b and 2J.

The difference for the embodiment shown in FIG. 2 shows that after User Input Box 2H is performed, which is similar to the description in 1I, the ME sends a reset signal to the UICC as shown in process box 2I, which can be in the form of either an Activation and Warm Reset or an Activation and Cold Reset as per ISO/IEC 7816-3, as soon as the Airplane Mode is turned OFF which turns the cellular radio on. This reset signal sent to the UICC forces the updated values in EF_LOCI and EF_EPSLOCI to be read by the ME into the ME's internal memory for use in Automatic Network Selection Process in process box 2J, which helps achieve Registration onto the visited available preferred PLMN within 30 seconds from the time that Airplane Mode is turned OFF in the selected roaming country.

Figure 5:
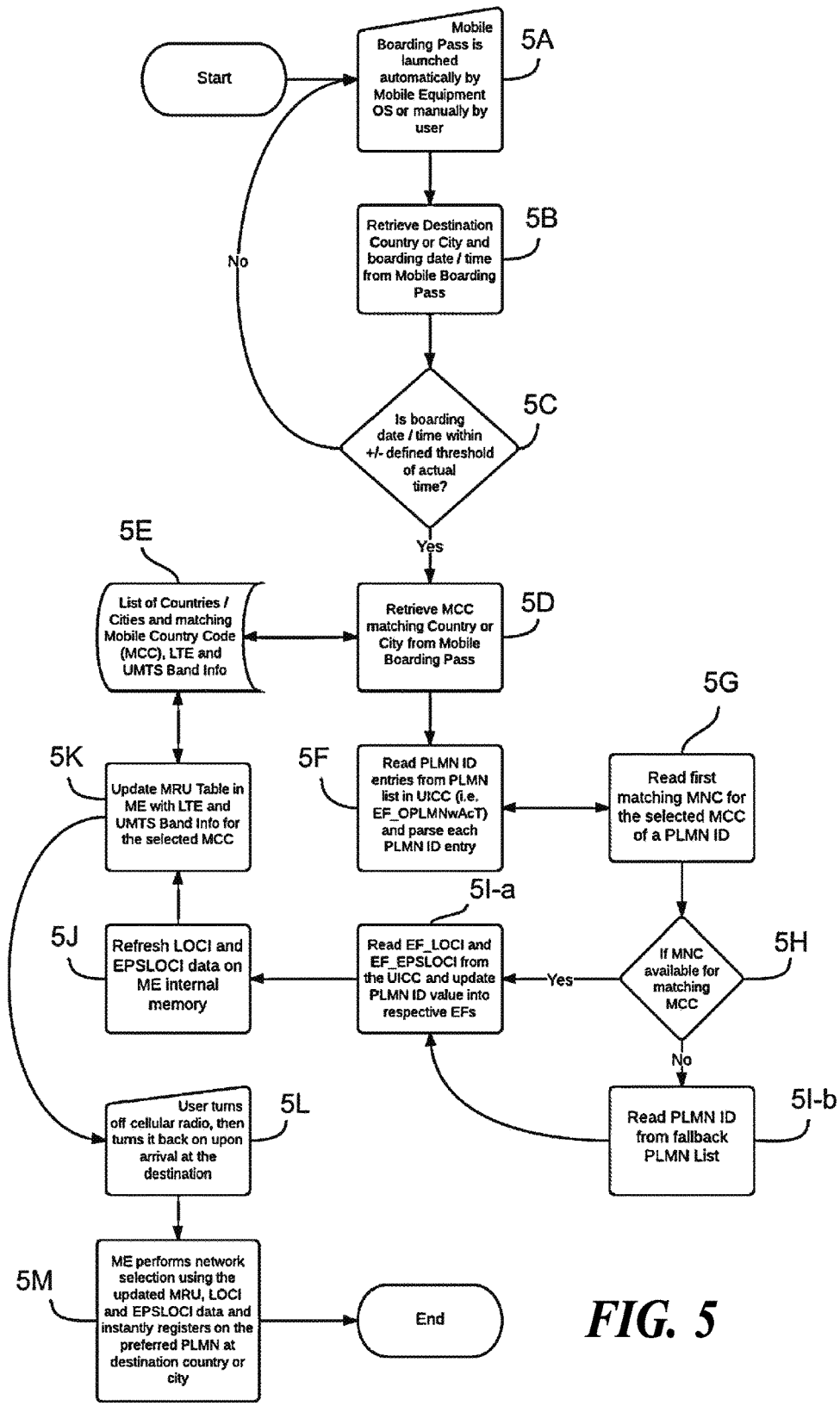
FIG. 5 is a flow diagram illustrating an exemplary embodiment of the present invention where a Mobile Country Code (MCC) is selected based on a mobile boarding pass and REFRESH—File Change Notification is used.

FIG. 5 shows an embodiment in which a Mobile Country Code (MCC) is selected based on a mobile boarding pass and REFRESH—File Change Notification is used. In Process Box 5A, an existing Situation Awareness technology (e.g., Google Now™, Apple™ Notifications, etc.) may bring to foreground the Mobile Boarding Pass information (or the user can at any time, bring the Mobile Boarding Pass info up manually). In Process Box 5B, the Date/Time of boarding and the Destination City (or Country is obtained) from the Mobile Boarding Pass information. Once the date/time is queried, in Decision Box 5C this information is compared to the actual date/time and if within a defined threshold (e.g., actual time within +/−3 hrs of boarding), the process proceeds to the remaining steps. In Process Box 5D, a MCC matching the Country or City from the Mobile Boarding Pass is obtained from a list of countries and/or cities and matching mobile country codes depicted in Database Box 5E. The list will also include LTE and/or UMTS band information as will be described below. Elements 5F to 5J and 5L of FIG. 5 correspond to elements 1D-1H and 1I of FIG. 1 and the corresponding description can be applied to these elements of FIG. 5 accordingly.

In most mobile devices, an MRU (most recently used) database within the baseband modem is used to store most recently used LTE and/or UMTS Band Information, which helps in speeding up network registration, as the baseband modem will not have to spend additional time searching for Bands, since it already has it in its MRU. In FIGS. 1 and 2, it is assumed that the LTE or UMTS Band info for the destination country is the same as the origination country. However, in some cases, this the Band info is different (i.e., In North America, cellular networks use UMTS Band II 1900 MHz and Band V 850 MHz, while in Europe, the cellular networks use UMTS Band I 2100 MHz). When travelling between US and Canada, Instant or near Instant Registration can be achieved in the embodiments depicted in FIGS. 1 and 2. However, when travelling between North America and Europe, unless UMTS Band I 2100 MHz is already populated in the MRU database within the baseband modem, then Instant Registration may not be achieved. Accordingly, in Process Box 5K, an MRU table is updated within the baseband modem with the LTE and/or UMTS Band Information associated to the Destination City (or Country). The LTE and/or UMTS band information can be retrieved from the list depicted in database box 5E. Alternatively, the information could be retrieved from a separate list, which could for example include the MCCs and corresponding LTE and UMTS band information without the countries or cities. Process box 5M of FIG. 5 corresponds to Process Box 1J of FIG. 1, but the updated MRU information is also available to the ME, allowing Instant or near Instant Registration even if the LTE and/or UMTS band information is different in the destination country and origination country.

It should be noted that while FIGS. 1 and 2 do not show the step of updating an MRU table in the ME with LTE and/or UMTS band information for the selected MCC, this step can also carried out in those embodiments, using a list of MCCs and matching LTE and/or UMTS band information to retrieve the LTE and/or UMTS band information to use to update the MRU.

Figure 6:
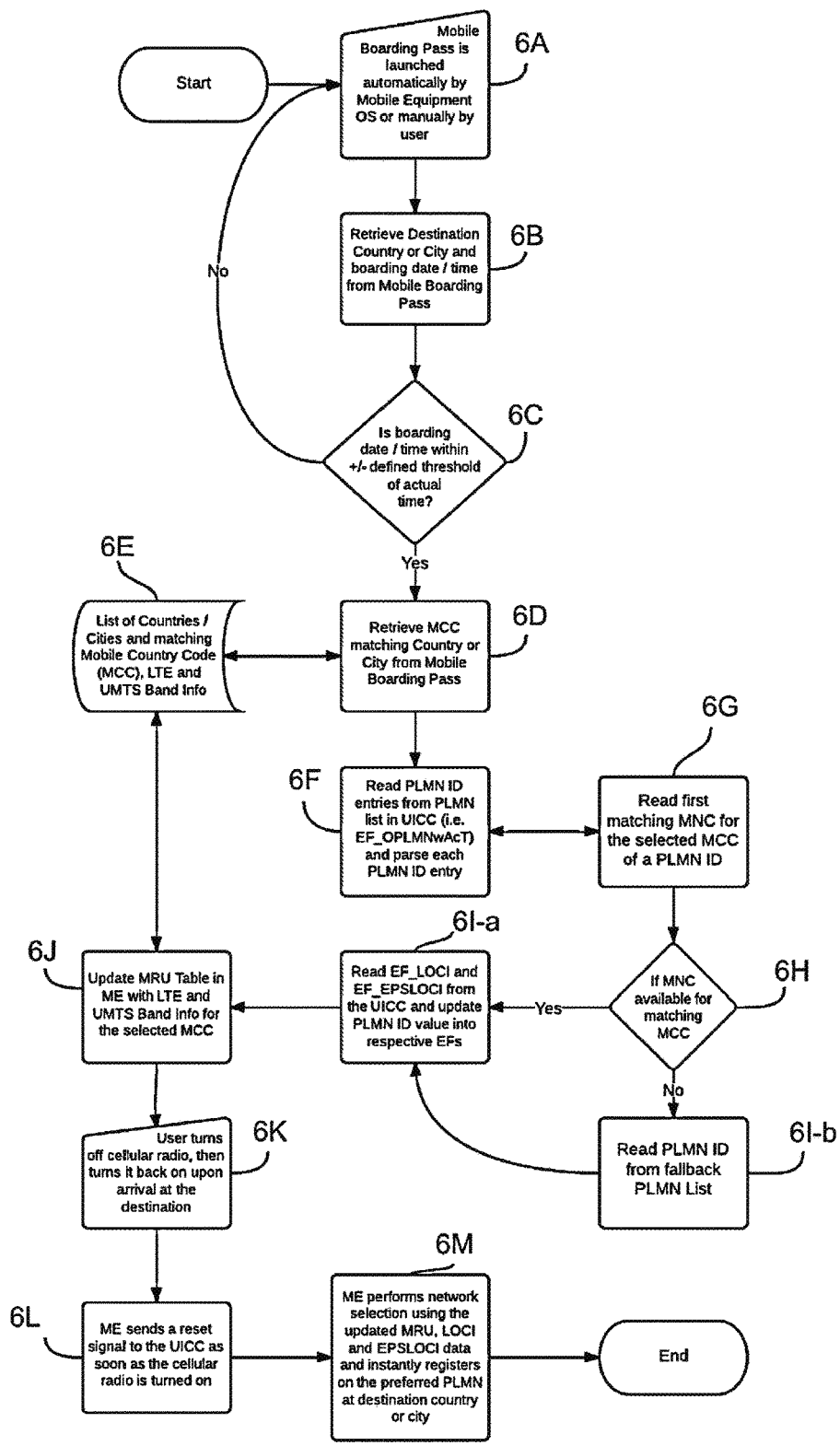
FIG. 6 is a flow diagram illustrating an exemplary embodiment of the present invention where a Mobile Country Code (MCC) is selected based on a mobile boarding pass and a reset signal is used.

In FIG. 6, another embodiment of Registration of a roaming UE in Automatic Network Selection mode onto a preferred VPLMN is presented in a Flow Diagram where a MCC is selected based on a mobile boarding pass and a reset signal is used. Elements 6A to 6J of FIG. 6 correspond to elements 5A to 5I-b and 5K of FIG. 5 and the corresponding description can be applied to FIG. 6 accordingly. Elements 6K to 6M of FIG. 6 correspond to elements 2H to 2J of FIG. 2, and the corresponding description can be applied to FIG. 6 accordingly, except that in process box 6M the updated MRU information is also available to the ME, allowing Instant or near Instant Registration even if the LTE and/or UMTS band information is different in the destination country and origination country.

FIGS. 3A-3D show a schematic diagrams of the first embodiment of disclosed method where a MCC is selected using a User Interface and a REFRESH—File Change Notification is used.

Figure 3A:
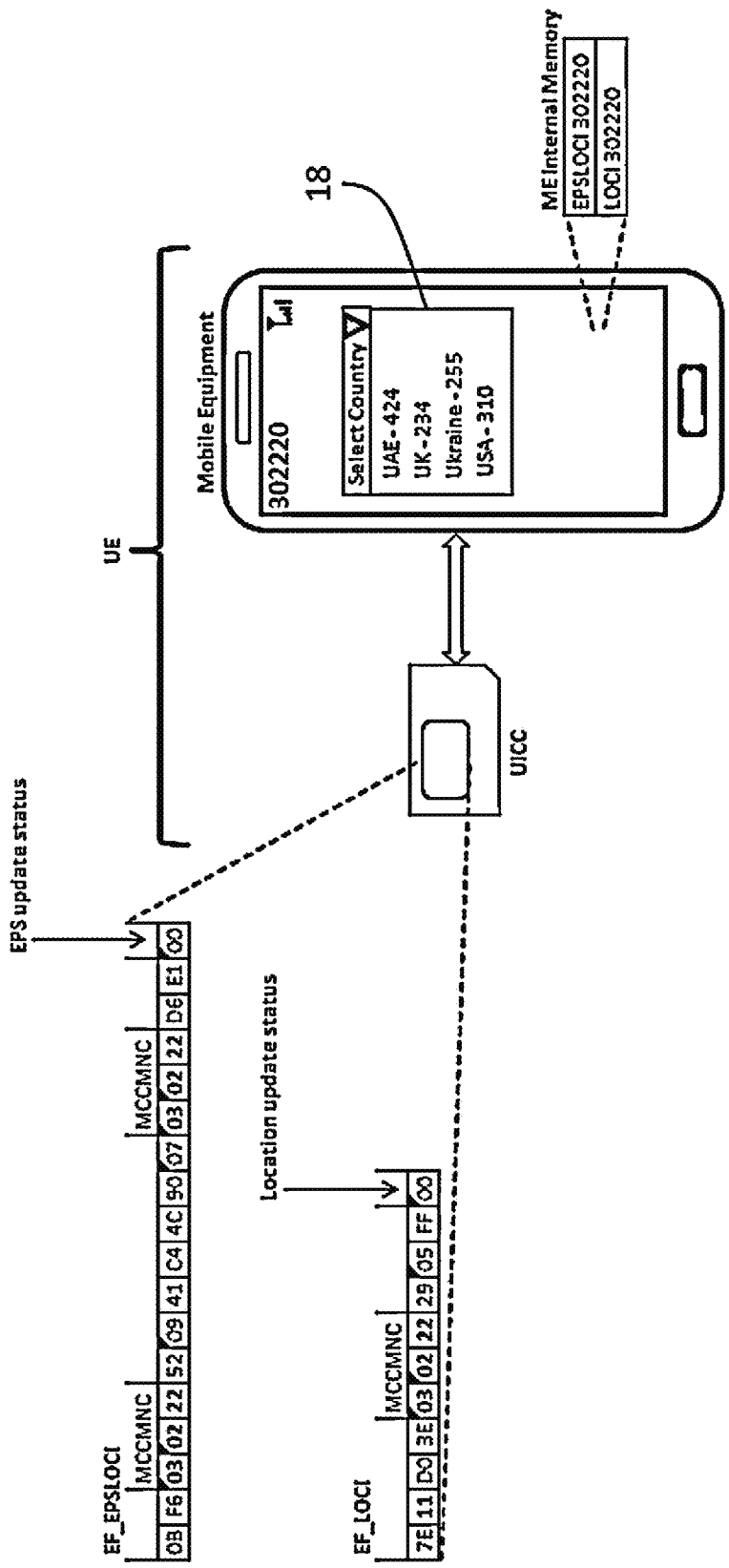
FIG. 3A is a schematic diagram illustrating an exemplary embodiment of the present invention where a MCC is selected using a User Interface and REFRESH—File Change Notification is used, showing the UE at the step of receiving an MCC via the User Interface on the ME.

In FIG. 3A, the schematic depicts the UE, consisting of the ME connected to the UICC, in a registered state on PLMN ID 302220. Typically, the Network Name is displayed on the ME screen rather than its associated PLMN ID, but for illustration of Instant or near Instant Registration of a roaming UE in Automatic Network Selection mode onto a preferred VPLMN, 302220 is shown on the top left hand corner of the ME showing the PLMN ID in which the UE is current registered on. Also shown is the current registration info within the EF_LOCI and EF_EPSLOCI of the UICC, as well as for simplicity of illustration, the image of PLMN ID content from these EFs in the ME Internal Memory. In practicality, the LOCI and EPSLOCI image in the ME Internal Memory would have the same content format as that in EF_LOCI and EF_EPSLOCI in the UICC. A list 18 of sample countries presented via UI from an App installed on the ME or a UI on the OS on the ME, is also shown in FIG. 3A from which the user can select.

Figure 3B:
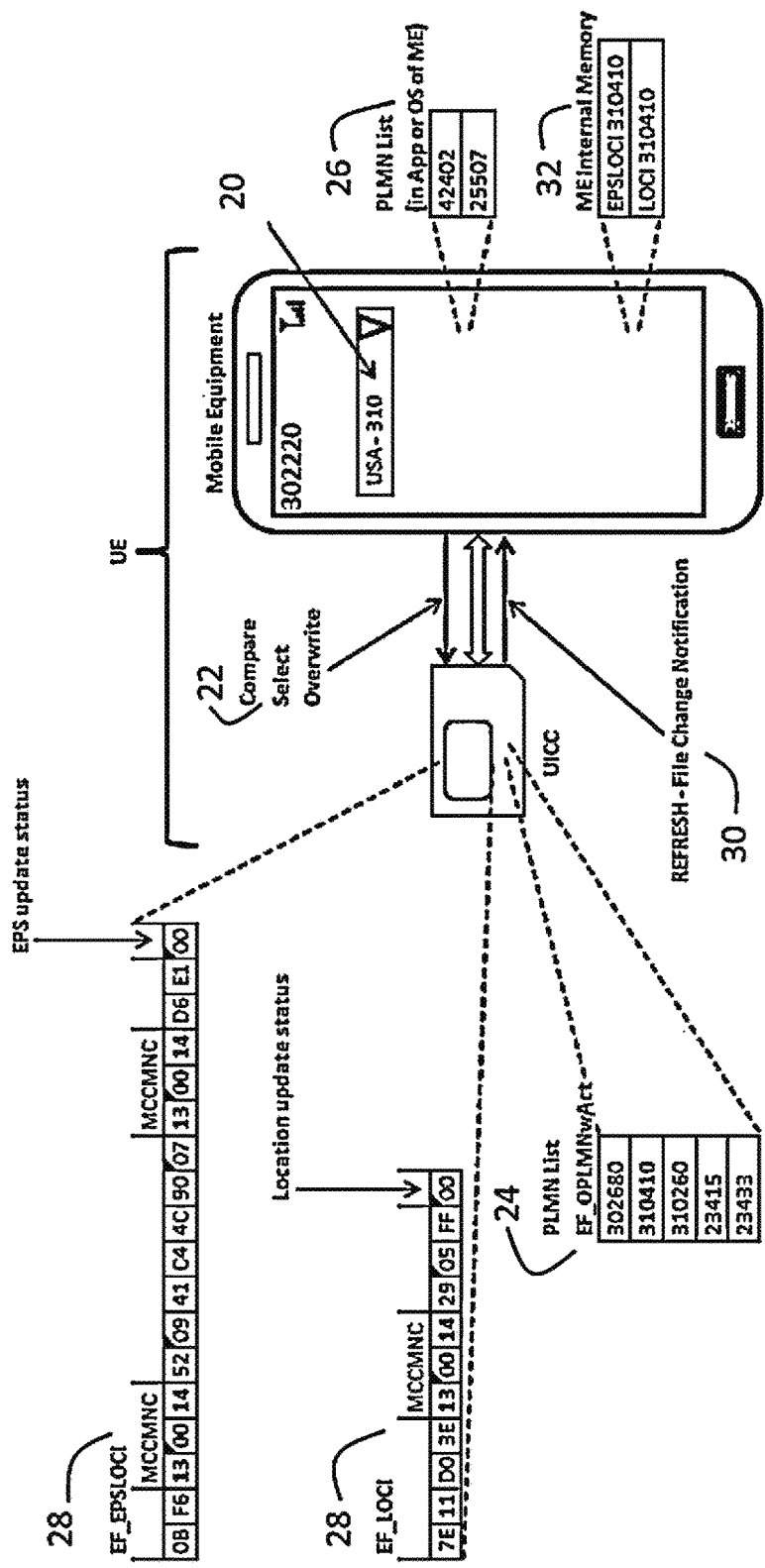
FIG. 3B is a schematic diagram illustrating the embodiment FIG. 3A, showing the method steps between receiving a MCC and entering airplane mode.

In FIG. 3B, the schematic shows that the user has selected USA, to which MCC 310 is associated, as shown in Step 20. Based on this selection, Step 22 is performed, in which the selected MCC is compared to the PLMN list in either the primary EF_OPLMNwAcT as shown in Step 24 or the fallback PLMN list within the App or OS of the ME as shown in Step 26. Once a first instance MCC match is successful in either Step 24 or Step 26, then the PLMN ID for the matching MCC is selected from the PLMN list and the MCCMNC contents in EF_LOCI and EF_EPSLOCI is overwritten with the selected PLMN ID, as shown in Step 28. After the updating is complete in Step 28, a REFRESH—File Change Notification is sent from the UICC to the ME as shown in Step 30, to indicated to the ME to refresh the image of LOCI and EPSLOCI in the internal memory with the new values that were updated in EF_LOCI and EF_EPSLOCI of the UICC as shown in Step 32.

Figure 3C:
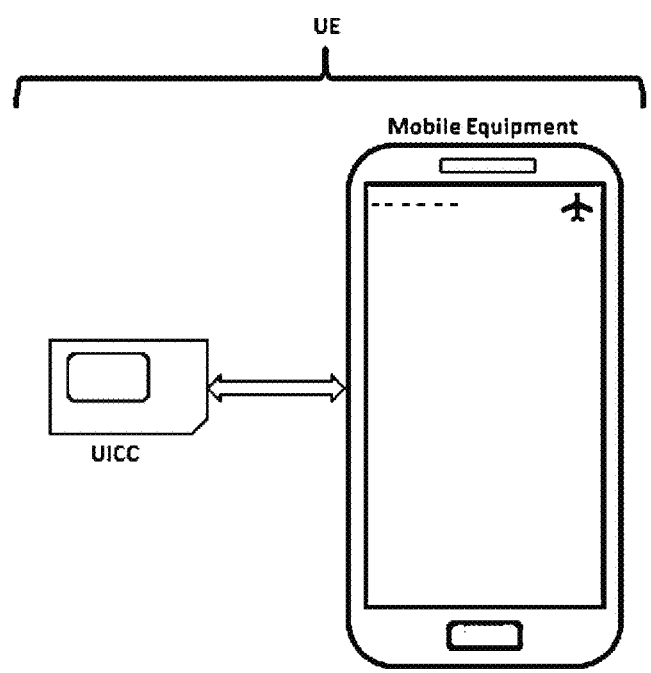
FIG. 3C is a schematic diagram illustrating the embodiment of FIG. 3A, showing the UE in airplane mode.

In FIG. 3C, the schematic shows that the user has turned the cellular radio off by turning Airplane Mode ON, as indicated by the airplane symbol at the top right hand corner of the ME's screen.

Figure 3D:
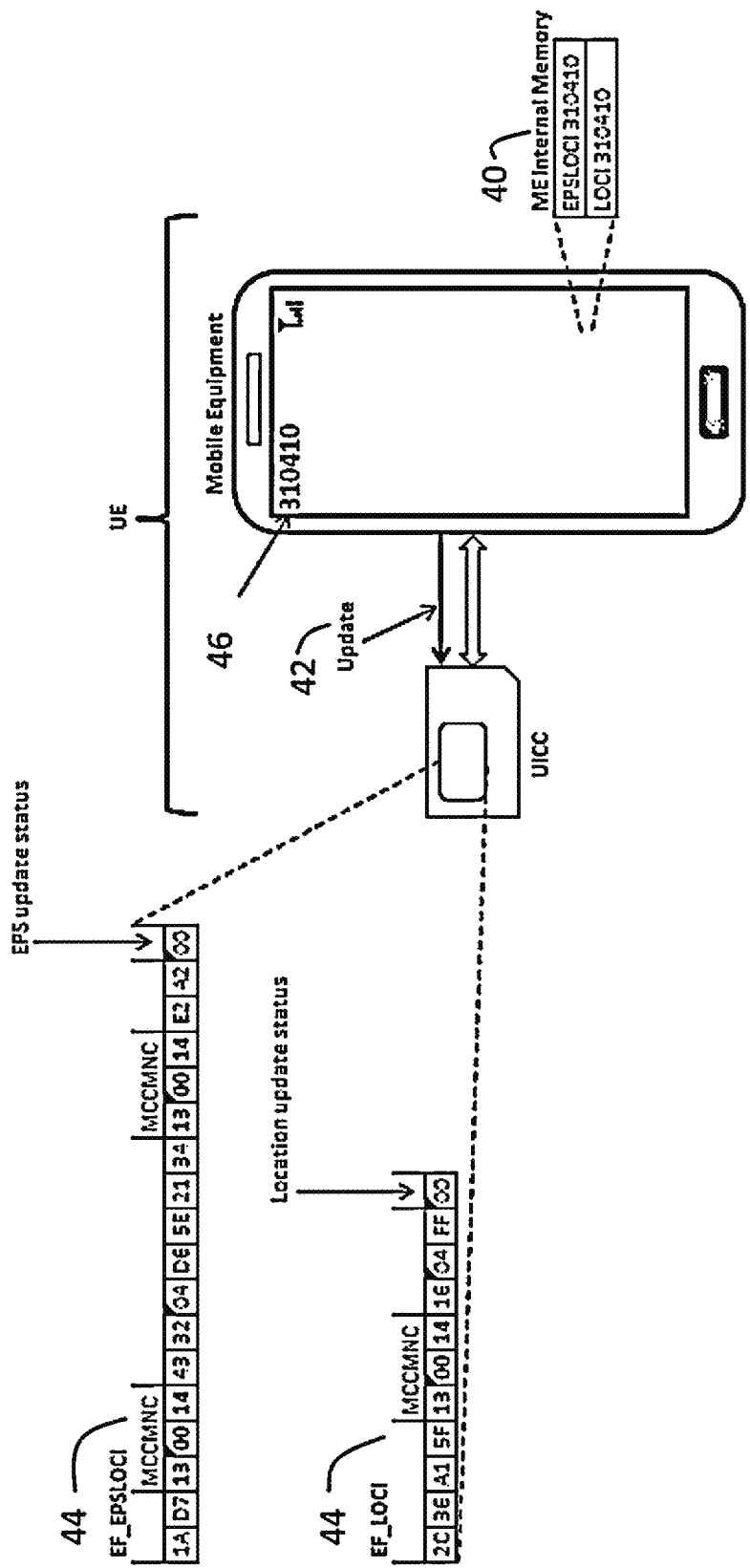
FIG. 3D is a schematic diagram illustrating the embodiment of FIG. 3A, showing the steps after exiting airplane mode.

FIG. 3D shows the schematic in which the user has turned Airplane Mode OFF upon arrival in the country selected in FIG. 3B. Once the cellular radio is turned on, the ME reads the last registered location information as indicated by the PLMN IDs in the ME Internal Memory as shown in Step 40, then uses the info to instantly authenticate to the VPLMN. Once authentication and registration is successful, the updated location information is updated in first the ME Internal Memory then both EF_LOCI and EF_EPSLOCI are updated as indicated in Step 42 and Step 44. Finally, the PLMN ID of the VPLMN in which the UE is registered to is displayed, as shown in Step 46.

FIGS. 4A-4D shows schematic diagrams of the first embodiment of disclosed method where a MCC is selected using a User Interface and a reset signal is used.

Figure 4A:
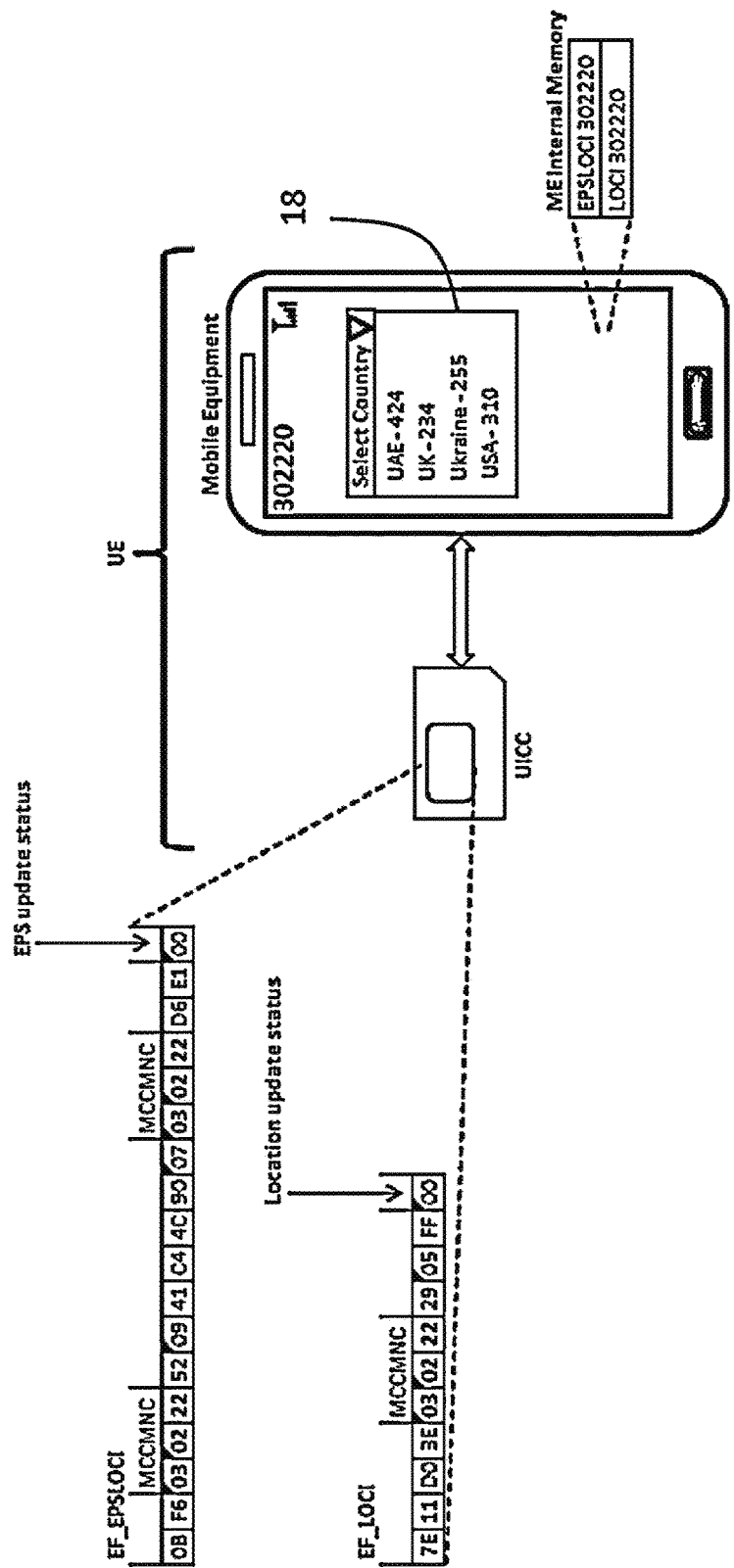
FIG. 4A is a schematic diagram illustrating an exemplary embodiment of the present invention where a MCC is selected using a User Interface and a reset signal is used, showing the UE at the step of receiving a MCC via the User Interface on the ME.

FIG. 4A is the same as FIG. 3A.

Figure 4B:
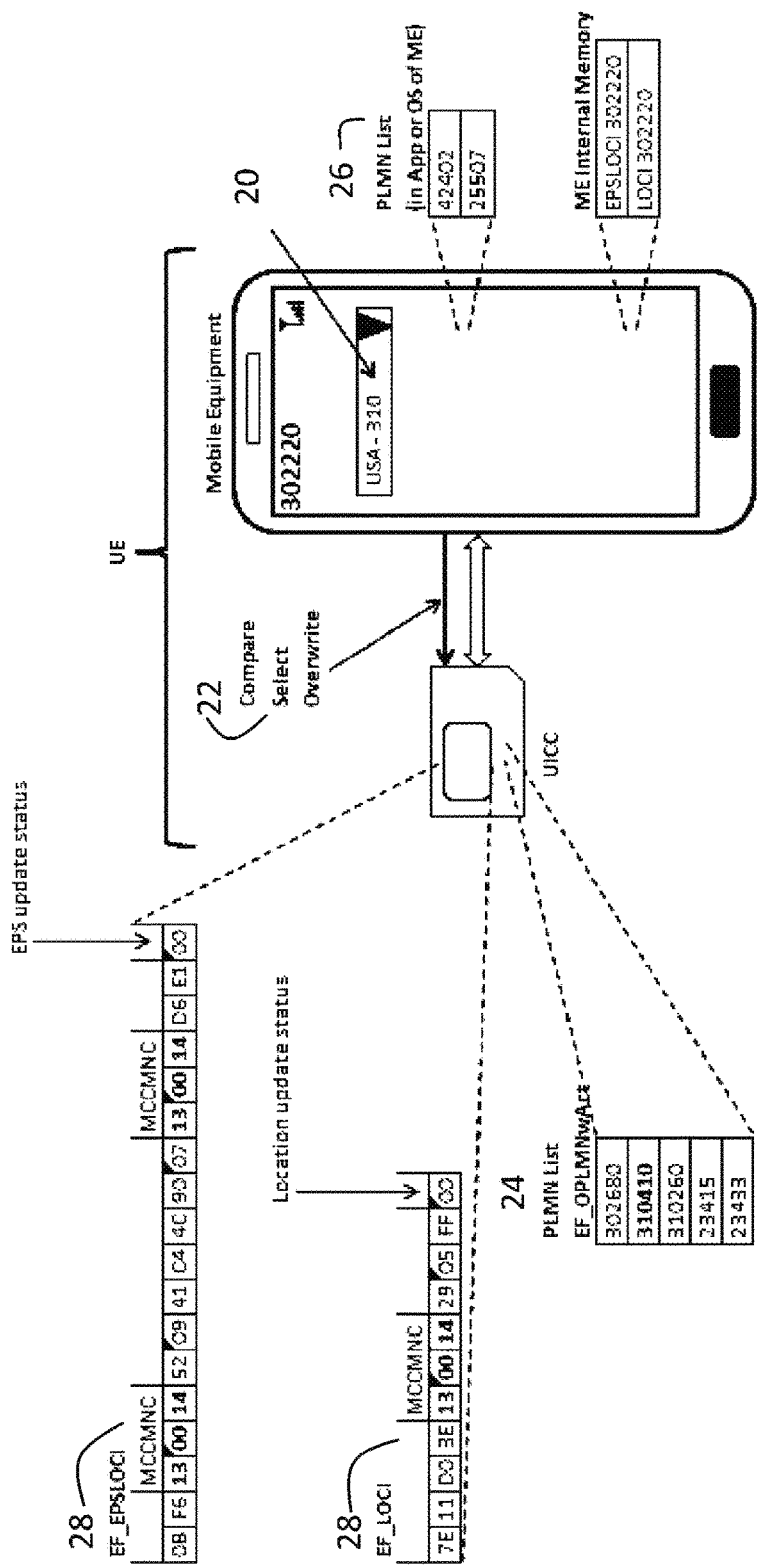
FIG. 4B is a schematic diagram illustrating the embodiment of FIG. 4A, showing the method steps between receiving a MCC and entering airplane mode.

FIG. 4B is the same as FIG. 3B, with the exception that there is no REFRESH used after EF_LOCI and EF_EPSLOCI has been updated, thus the respective LOCI and EPSLOCI image files within the ME Internal Memory is not updated with the new values in EF_LOCI and EF_EPSLOCI.

Figure 4C:
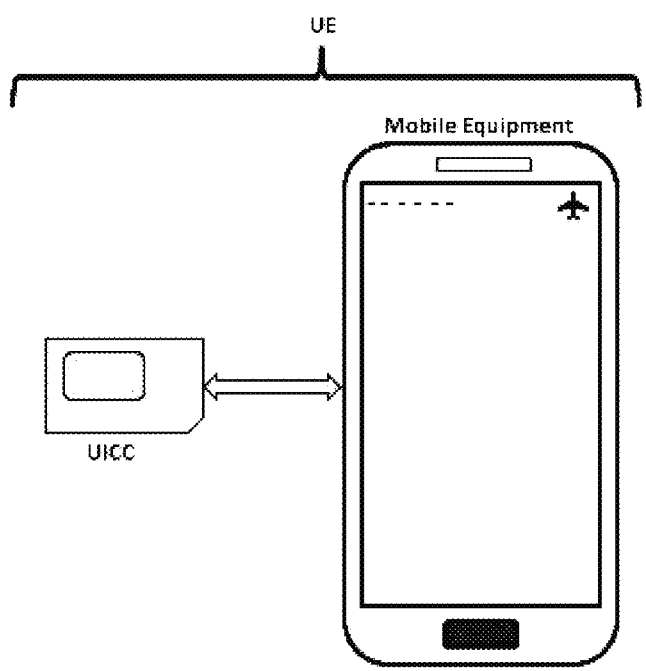
FIG. 4C is a schematic diagram illustrating the embodiment of FIG. 4A, showing the UE in airplane mode.

FIG. 4C is the same as FIG. 3C.

Figure 4D:
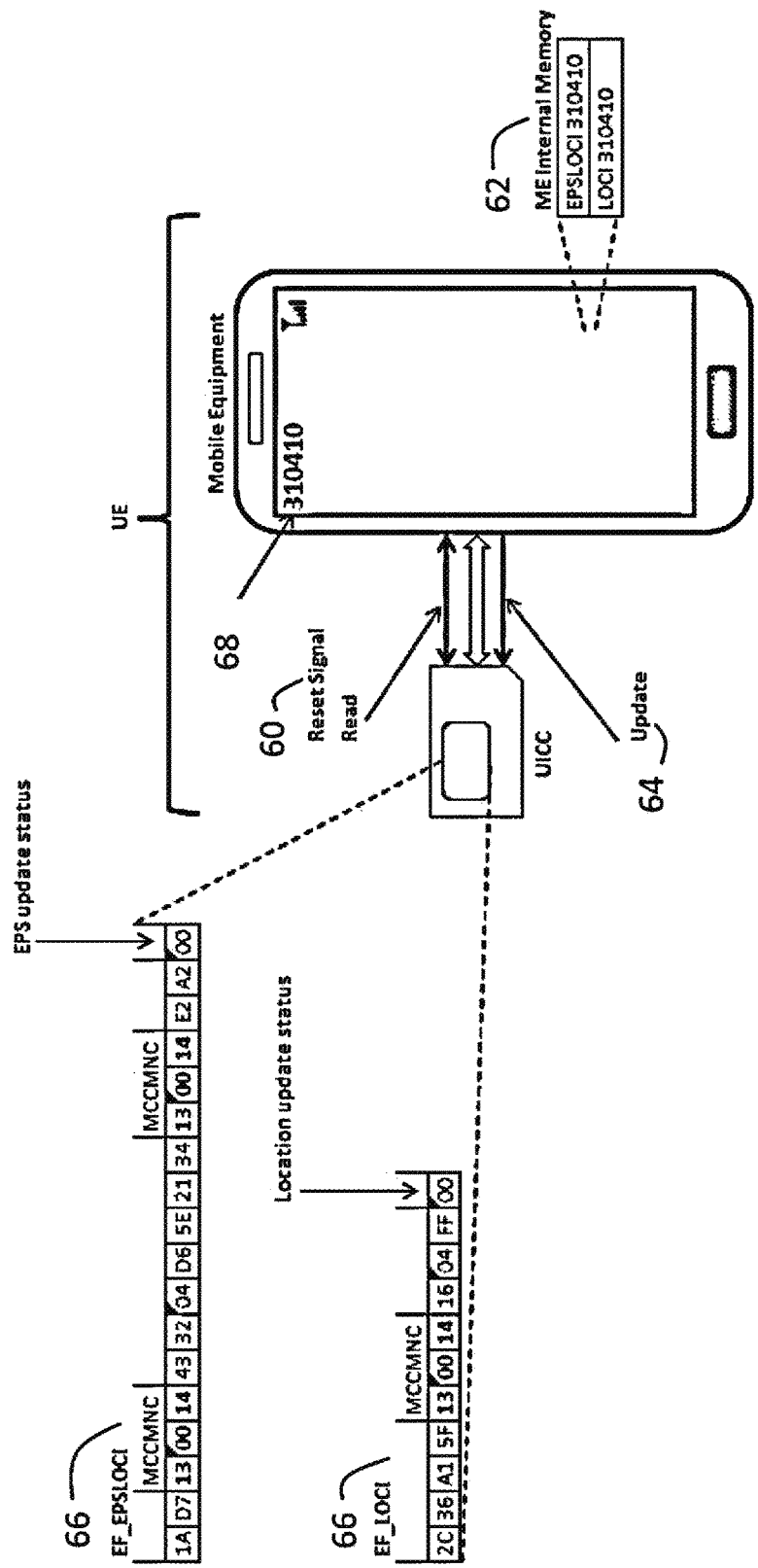
FIG. 4D is a schematic diagram illustrating the embodiment of FIG. 4A, showing the steps after exiting airplane mode.

FIG. 4D shows the schematic in which the user has turned Airplane Mode OFF upon arrival in the country selected in FIG. 4B. Once the cellular radio is turned on, a reset signal comprising of either Activation and Warm Reset or Activation and Cold Reset as per ISO/IEC 7816-3, is sent from the ME to the UICC as indicated in Step 60. This causes the ME to re-read all EFs in the UICC including the values updated in EF_LOCI and EF_EPSLOCI as per Step 28 in FIG. 4B, and update respective LOCI and EPSLOCI image in the ME Internal Memory as indicated in Step 62. The ME then reads the updated information as indicated by the PLMN IDs in the ME Internal Memory as shown in Step 62, then uses the info to instantly authenticate to the VPLMN. Once authentication and registration is successful, the updated location information is updated in first the ME Internal Memory then both EF_LOCI and EF_EPSLOCI are updated as indicated in Step 64 and Step 66. Finally, the PLMN ID of the VPLMN in which the UE is registered to is displayed, as shown in Step 68.

Embodiments of the disclosed methods achieve near instant or instant first time registration, for example, within thirty seconds, onto an available visited preferred PLMN when Airplane Mode is turned off.

ABBREVIATIONS used herein:
3GPP 3$^{rd}$ Generation Partnership Program
ACF Access Control Framework
ADF Application Dedicated File
APDU Application Protocol Data Unit
API Application Programming Interface
EF Elementary File
EPSLOCI Evolved Packet System Location Information
ETSI European Telecommunications Standards Institute
GPSEAC Global Platform Secure Element Access Control
GSM Global System for Mobile Communications
HPLMN Home Public Land Mobile Network
ID Identity
IEC International Electrotechnical Commission
ISO International Organization for Standardization
LOCI Location Information
LTE Long Term Evolution
ME Mobile Equipment
MCC Mobile Country Code
MNC Mobile Network Code
MRU Most Recently Used
OPLMNwAcT Operator Public Land Mobile Network with Access Technology
OS Operating System
OTA Over the Air
PLMN Public Land Mobile Network
SEEK Secure Element Evaluation Kit
SIM Subscriber Identity Module
TS Technical Specification
UE User Equipment
UI User Interface
UICC Universal Integrated Circuit Card
UMTS Universal Mobile Telecommunications System
USIM Universal Subscriber Identity Module
VPLMN Visited Public Land Mobile Network Immaterial modifications may be made to the embodiments described here without departing from what is covered by the claims. In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

What is claimed is:

1. A method of configuration of a roaming user equipment (UE) in Automatic Network Selection mode to register onto a preferred Visited Public Land Mobile Network (VPLMN) on a cellular radio of the UE turning on, in which the UE comprises a Universal Integrated Circuit Card (UICC) and a mobile equipment (ME), the method comprising the steps of:

receiving a Mobile Country Code (MCC) by user input on a user interface on the ME;

comparing the received MCC with MCCs of Public Land Mobile Network Identities (PLMN IDs) stored in a Public Land Mobile Network (PLMN) list;

selecting the preferred VPLMN by selecting a highest priority PLMN ID in the PLMN list whose MCC matches the received MCC;

overwriting an entry in elementary files containing location information in the UICC with identification for the preferred VPLMN, in which the elementary files containing location information comprise Elementary File Location Information EF_LOCI and Elementary File Evolved Packet System EF_EPSLOCI and in which EF_LOCI and EF_EPSLOCI are updated by overwriting PLMN ID content of EF_LOCI and EF_EPSLOCI with the selected highest priority PLMN ID, while keeping existing bytes intact and setting the last byte to "updated" by setting the last byte to 00, the PLMN ID content of EF_LOCI being bytes 5, 6 and 7 of file ID 6F7E, and PLMN ID content of EF_EPSLOCI being bytes 3, 4, 5, 13, 14 and 15 of file ID 6FE3;

sending a REFRESH—File Change Notification from the UICC to the ME once updating the elementary files is completed, the REFRESH—File Change Notification including the elementary files in a REFRESH File List; and sending a reset signal comprising either Activation and Warm Reset or Activation and Cold Reset as per ISO/IEC 7816-3 from the ME to the UICC whenever the cellular radio is turned on by toggling an Airplane Mode OFF.

2. The method of claim 1 further comprising the step of the UE entering Airplane Mode before the Airplane Mode is toggled OFF.

3. A method of facilitating registration of a roaming user equipment (UE) comprising a mobile equipment (ME) onto a preferred Visited Public Land Mobile Network (VPLMN), comprising sending instructions to the UE to cause the ME to carry out the method of claim 1.

4. A non-transitory computer-readable medium containing instructions for a Universal Integrated Circuit Card (UICC) or mobile equipment (ME) to carry out the steps of claim 1.

5. A method of Registration of a roaming user equipment (UE) in Automatic Network Selection mode onto a preferred Visited Public Land Mobile Network (VPLMN), in which the UE comprises a Universal Integrated Circuit Card (UICC) and a mobile equipment (ME), the method comprising the steps of:

receiving a Mobile Country Code (MCC) by user input on a user interface on the ME;

comparing the received MCC with MCCs of Public Land Mobile Network Identities (PLMN IDs) stored in a Public Land Mobile Network (PLMN) list;

selecting the preferred VPLMN by selecting a highest priority PLMN ID in the PLMN list whose MCC matches the received MCC;

overwriting an entry in elementary files containing location information in the UICC with identification for the preferred VPLMN, in which the elementary files containing location information comprise Elementary File Location Information EF_LOCI and Elementary File Evolved Packet System EF_EPSLOCI and in which EF_LOCI and EF_EPSLOCI are updated by overwriting PLMN ID content of EF_LOCI and EF_EPSLOCI with the selected highest priority PLMN ID, while keeping existing bytes intact and setting the last byte to "updated" by setting the last byte to 00, the PLMN ID content of EF_LOCI being bytes 5, 6 and 7 of file ID 6F7E, and PLMN ID content of EF_EPSLOCI being bytes 3, 4, 5, 13, 14 and 15 of file ID 6FE3;

sending a REFRESH—File Change Notification from the UICC to the ME once updating the elementary files is completed, the REFRESH—File Change Notification including the elementary files in a REFRESH File List; and on a cellular radio of the UE turning on, by toggling an Airplane Mode OFF the UE sending a reset signal comprising either Activation and Warm Reset or Activation and Cold Reset as per ISO/IEC 7816-3 from the ME to the UICC registering onto the preferred VPLMN.

6. The method of claim 4 further comprising the step of the UE entering Airplane Mode before the Airplane Mode is toggled OFF.

\* \* \* \* \*